US012073782B2

(12) United States Patent
Piper et al.

(10) Patent No.: US 12,073,782 B2
(45) Date of Patent: Aug. 27, 2024

(54) DIRECT LED TEMPERATURE SENSING SYSTEMS AND METHODS

(71) Applicant: Apple Inc., Cupertino, CA (US)

(72) Inventors: Johan L Piper, Cupertino, CA (US); Arash Hazeghi, San Jose, CA (US); Adam Adjiwibawa, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/335,114

(22) Filed: Jun. 14, 2023

(65) Prior Publication Data

US 2024/0105118 A1 Mar. 28, 2024

Related U.S. Application Data

(60) Provisional application No. 63/409,573, filed on Sep. 23, 2022.

(51) Int. Cl.
*G09G 3/3225* (2016.01)
*G09G 3/34* (2006.01)

(52) U.S. Cl.
CPC ........... *G09G 3/3225* (2013.01); *G09G 3/346* (2013.01); *G09G 2310/08* (2013.01); *G09G 2320/041* (2013.01)

(58) Field of Classification Search
CPC .. G09G 3/346; G09G 3/3225; G09G 3210/08; G09G 3220/041
See application file for complete search history.

(56) References Cited

U.S. PATENT DOCUMENTS

| | | | | |
|---|---|---|---|---|
| 9,176,316 | B2 | 11/2015 | Morgan et al. | |
| 9,196,189 | B2 | 11/2015 | Gandhi et al. | |
| 9,324,279 | B2 | 4/2016 | Fujiwara et al. | |
| 10,319,281 | B2 | 6/2019 | Bergquist | |
| 11,081,082 | B2 | 8/2021 | Boev et al. | |
| 2003/0058543 | A1 | 3/2003 | Sheedy et al. | |
| 2007/0024529 | A1 | 2/2007 | Ben-David et al. | |
| 2008/0012997 | A1 * | 1/2008 | Reuter ................. | H04N 9/3111 348/E9.027 |
| 2009/0103053 | A1 * | 4/2009 | Ichikawa ............. | H04N 5/7458 353/33 |

FOREIGN PATENT DOCUMENTS

| | | | |
|---|---|---|---|
| WO | 2010014991 | A1 | 2/2010 |

* cited by examiner

*Primary Examiner* — Kevin M Nguyen
(74) *Attorney, Agent, or Firm* — Fletcher Yoder P.C.

(57) ABSTRACT

A device may include an electronic display to display an image frame based on image data. The electronic display may include an illuminator that generates light, multiple light regulators that control emission of the light pixel locations on the electronic display based on bitplane data, and driving circuitry that applies an operating electrical stimulus to the illuminator during an emission period of the image frame and a reference electrical stimulus to the illuminator during an off period of the image frame. While the reference electrical stimulus is applied the bitplane data may be indicative of off bitplane. Additionally, the electronic display may include measurement circuitry that measures a response characteristic of the illuminator in response to the reference electrical stimulus and generates temperature data indicative of the temperature of the illuminator based on the response characteristic.

20 Claims, 10 Drawing Sheets

DIRECT LED TEMPERATURE SENSING SYSTEMS AND METHODS

CROSS-REFERENCE TO RELATED APPLICATIONS

This application claims priority to U.S. Provisional Application No. 63/409,573, filed on Sep. 23, 2022, and entitled "Direct LED Temperature Sensing Systems and Methods," the contents of which is hereby incorporated by reference in its entirety.

SUMMARY

The present disclosure generally relates to the temperature sensing of illuminators such as light emitting diodes (LEDs) within an electronic display.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with embodiments of the present disclosure, it may be desirable to directly measure/estimate the temperature of an illuminator (e.g., backlight or projector) such as an LED, organic LED (OLED), or other light source within an electronic display. Such an illuminator (e.g., backlight or projector) may generate light for several different pixels, and a light regulator such as a mirror and/or a transmissive pixel may allow a portion of the generated light to be emitted based on a luminance value corresponding to the image data for the pixel. For example, a reflective technology display may have individually controlled color component illuminators that provide light to multiple pixels of the display panel via one or more reflective components (e.g., mirrors, light guides, etc.). However, during direct measurement (e.g., at and via the illuminator) of the temperature, a reference voltage or current may be applied, which may cause illumination of the illuminator separate from the light emissions associated with the image data.

As such, light regulators (e.g., mirrors or transmissivity regulating pixels) that adjust when and/or how much light is emitted from the electronic display may be used to block or redirect the light associated with application of the reference voltage or reference current. In other words, during moments when light would otherwise not be emitted from the electronic display, such as between light emissions of a single image frame, after light emissions of an image frame, and/or during any suitable moments that the illuminators would otherwise be off, the light regulators may be used to block or redirect light generated as a result of the reference current or reference voltage. As such, the temperature of an illuminator may be directly measured without or with reduced image artifacts associated with the application of the reference current or a reference voltage.

BRIEF DESCRIPTION OF THE DRAWINGS

Various aspects of this disclosure may be better understood upon reading the following detailed description and upon reference to the drawings described below.

DETAILED DESCRIPTION

Figure 1:
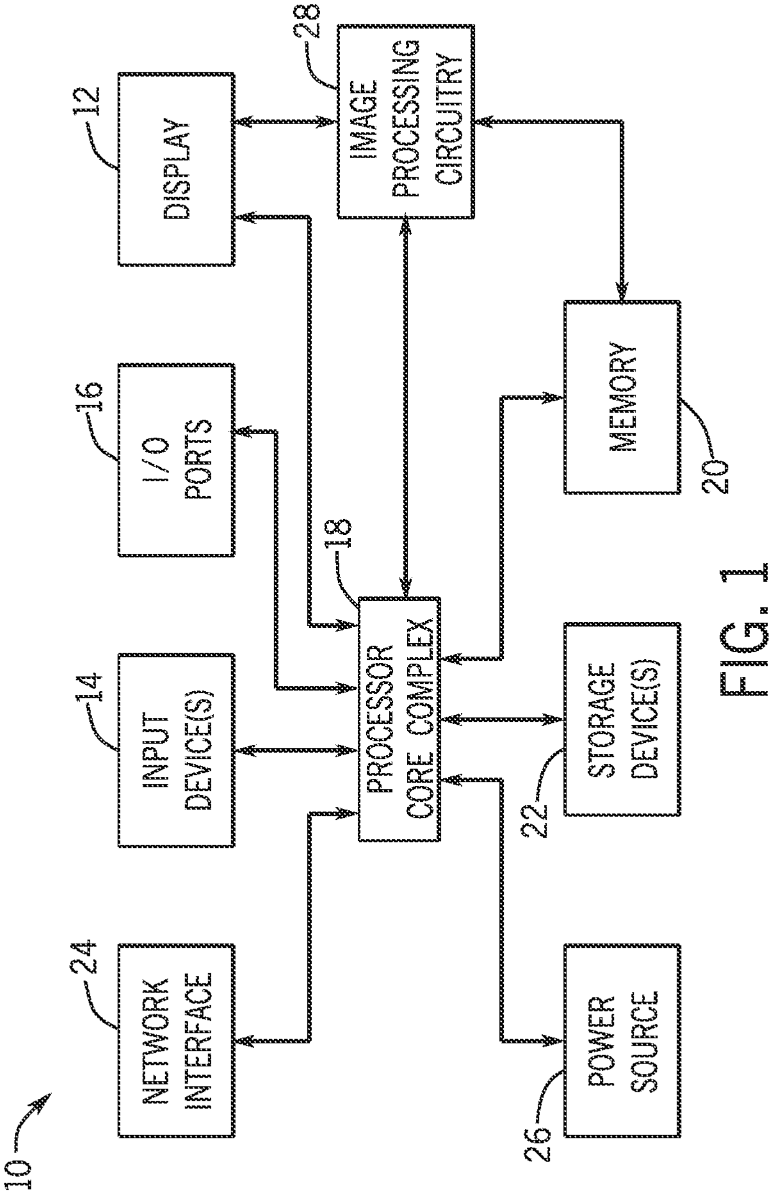
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (e.g., brightness and/or color) at pixel locations based on corresponding image data. For example, an image data source may provide image data as a stream of pixel data, in which data for each pixel location indicates a target luminance. In some embodiments, the electronic display may include illuminators (e.g., backlights or projectors) that generate light for several different pixels, and each pixel may allow a portion of the generated light to be emitted (e.g., via mirrors and/or transmissivity regulating elements) based on a luminance value of the image data corresponding to the pixel. Such displays may include but are not limited to reflective technology displays (e.g., digital micro-mirror displays (DMDs), ferroelectric-liquid-crystal-on-silicon (FLCOS) display, etc.) and transmissive displays such as liquid crystal displays (LCDs).

An electronic display may utilize one or more illuminators (e.g., backlights, projectors, etc.) such as light emitting diodes (LEDs), organic LEDs (OLEDs), etc. to provide light for generating an image. However, the operation and/or output of such illuminators may vary based on their temperature. As such, it may be desirable to measure, estimate, or otherwise receive the temperature of one or more illuminators and utilize the temperature to compensate or alter one or more operations of the electronic device. In some scenarios, temperature sensors may be placed proximate an illuminator to estimate its temperature. However, the additional components of and/or real estate utilized by separate temperature sensors may increase manufacturing costs and/or be unviable for some implementations (e.g., based on space limitations). As such, directly measuring the temperature of the illuminator based on the voltage/current characteristics of the illuminator itself may increase the spatial efficiency, manufacturing efficiency, and/or efficacy of an electronic display with temperature sensed illuminators.

For example, in response to being supplied with a reference current or a reference voltage, an illuminator may exhibit a voltage response (e.g., forward voltage across the illuminator) or current response (e.g., current through the illuminator), respectively, indicative of the temperature of the illuminator. In either case, applying a reference voltage or a reference current to estimate the temperature directly (e.g., at and via the illuminator's response) may cause illumination of the illuminator, which may lead to image artifacts being displayed if perceived by a viewer. As discussed further below, the light regulators (e.g., mirrors or transmissivity regulating pixels) that adjust when and/or how much light is emitted from the electronic display may be used to block or redirect the generated light while the reference current or reference voltage is applied. As such, the temperature of the illuminator may be directly measured without or with reduced image artifacts associated with the application of the reference current or a reference voltage.

With the foregoing in mind, FIG. 1 is an example electronic device 10 with an electronic display 12 having independently controlled color component illuminators (e.g., projectors, backlights, etc.). As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Additionally, the image processing circuitry 28 (e.g., a graphics processing unit, a display image processing pipeline, etc.) may be included in the processor core complex 18.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include cache memory or random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control the luminance of a color component (e.g., red, green, or blue). As used herein, a display pixel may refer to a collection of sub-pixels (e.g., red, green, and blue subpixels) or may refer to a single sub-pixel. Moreover, a display pixel may include any components that generate, direct, or otherwise control light emission at a pixel location and may or may not be located at the pixel location.

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18 and/or the image processing circuitry 28. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
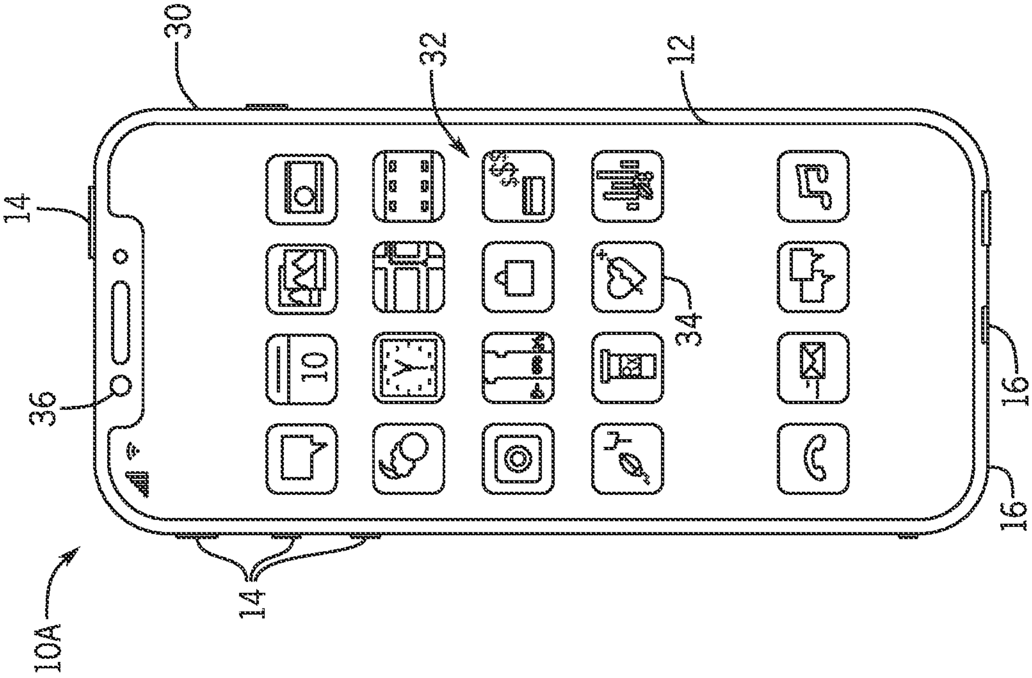
FIG. 2 is a front view of a mobile phone representing an example of the electronic device of FIG. 1, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as an iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
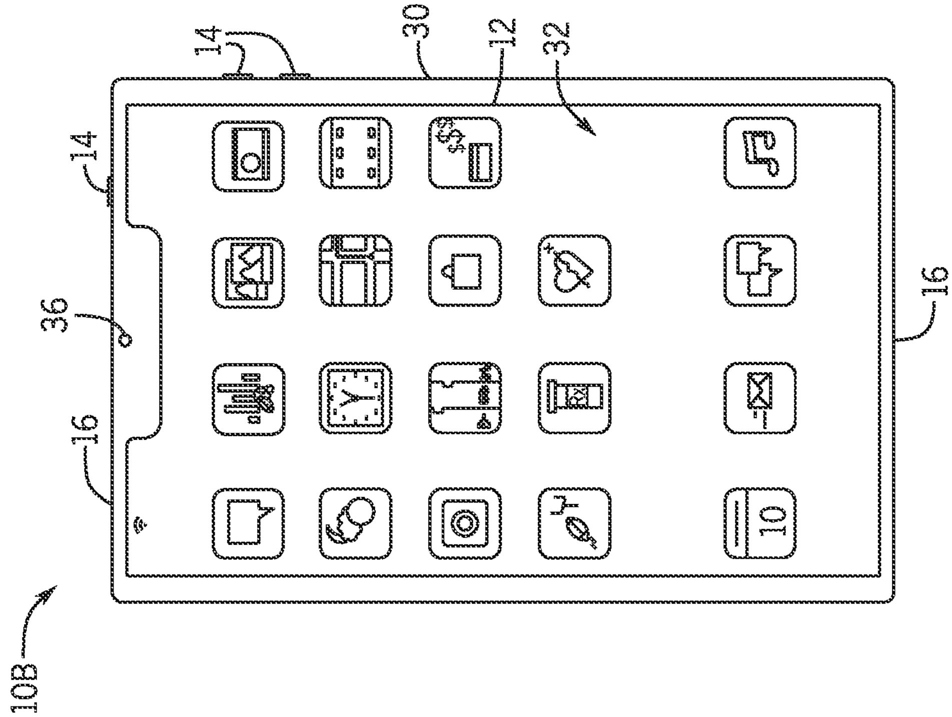
FIG. 3 is a front view of a tablet device representing an example of the electronic device of FIG. 1, in accordance with an embodiment.
Figure 4:
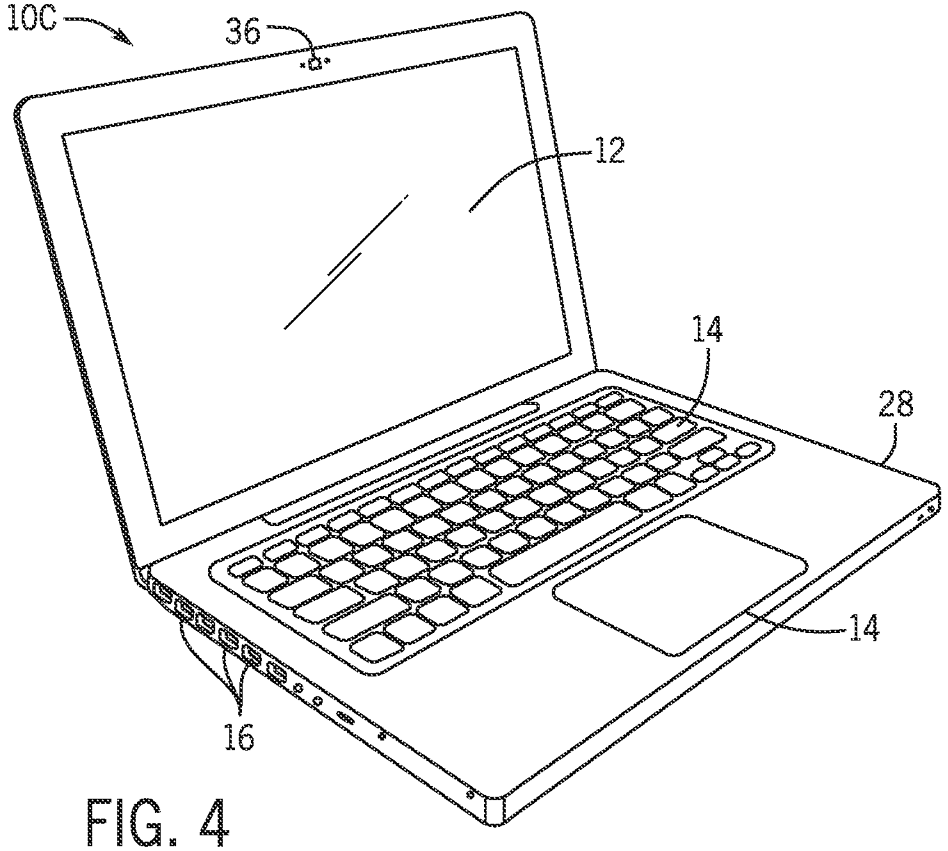
FIG. 4 is a front view of a notebook computer representing an example of the electronic device of FIG. 1, in accordance with an embodiment.
Figure 5:
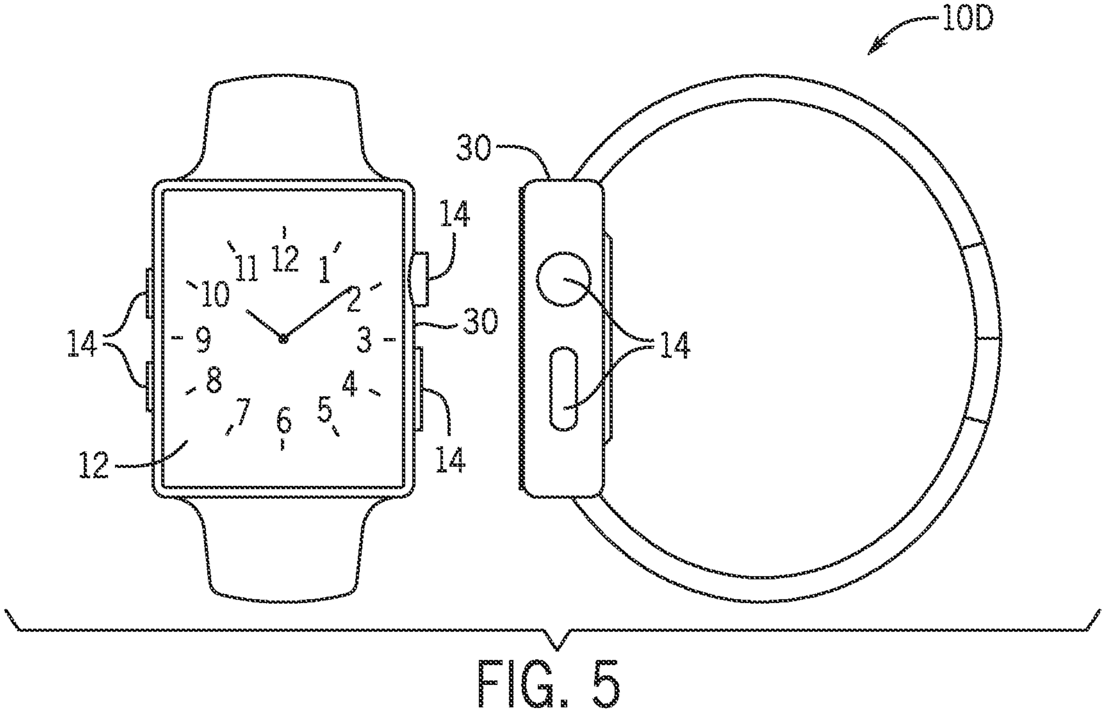
FIG. 5 are front and side views of a watch representing an example of the electronic device of FIG. 1, in accordance with an embodiment.

Another example of a suitable electronic device 10, specifically a tablet device 10B, is shown in FIG. 3. For illustrative purposes, the tablet device 10B may be an iPad® model available from Apple Inc. A further example of a suitable electronic device 10, specifically a computer 10C, is shown in FIG. 4. For illustrative purposes, the computer 10C may be a MacBook® or iMac® model available from Apple Inc. Another example of a suitable electronic device 10, specifically a watch 10D, is shown in FIG. 5. For illustrative purposes, the watch 10D may be an Apple Watch® model available from Apple Inc. As depicted, the tablet device 10B, the computer 10C, and the watch 10D each also includes an electronic display 12, input devices 14, I/O ports 16, and an enclosure 30.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 6:
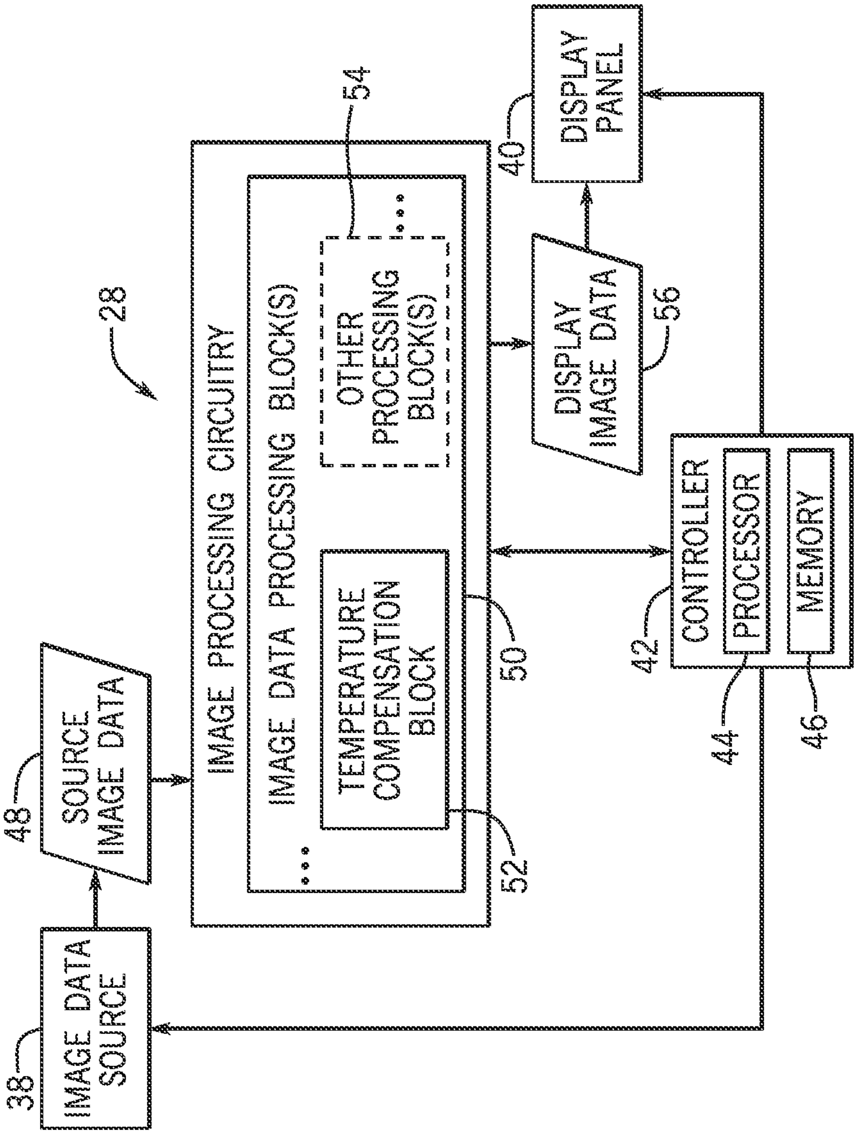
FIG. 6 is a block diagram of the image processing circuitry of FIG. 1 including a temperature compensation block, in accordance with an embodiment.

To help illustrate, a portion of the electronic device 10, including image processing circuitry 28, is shown in FIG. 6. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images from cameras 36, images stored in memory, graphics generated by the processor core complex 18, or a combination thereof. Additionally, the image processing circuitry 28 may include one or more sets of image data processing blocks 50 (e.g., circuitry, modules, or processing stages) such as a temperature compensation block 52. As should be appreciated, multiple other processing blocks 54 may also be incorporated into the image processing circuitry 28, such as a color management block, a dither block, a burn-in compensation (BIC) block, a scaling/rotation block, etc. before and/or after the temperature compensation block 52. The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

As discussed herein, the electronic display 12 may utilize one or more illuminators (e.g., backlights, projectors, etc.) such as light emitting diodes (LEDs), organic LEDs (OLEDs), etc. to generate an image. However, the operation and/or output of such illuminators may vary based on their temperature. As such, in some embodiments, the temperature compensation block 52 may be used to measure, estimate, or otherwise receive the temperature of one or more illuminators and utilize the temperature to compensate or alter one or more operations of the electronic device 10. For example, the temperature compensation block 52 may receive voltage and/or current measurements associated with an illuminator and determine/estimate the temperature of the illuminator based thereon. Moreover, the temperature compensation block 52 may utilize the temperature of the illuminators to apply compensations to the image data and/or the supplied illuminator currents/voltages to account for temperature related effects (e.g., color shifts, timing alterations, etc.). As should be appreciated, as used herein, the temperature compensation block 52 may be considered as performing a standalone compensation/analysis or as a component or sub-component of any portion of the image processing circuitry 28 that utilizes the temperature of an illuminator in statistics, compensation, and/or data analysis. As non-limiting examples, such compensation/analysis may include color shift compensations, burn-in related aging statistics gathering, etc.

In general, an illuminator (e.g., backlight or projector) may generate light for multiple different pixels, and each pixel may allow a portion of the generated light to be emitted based on a luminance value corresponding to the image data for the pixel. In some embodiments, the electronic display 12 may include illuminators for multiple different color components (e.g., a red illuminator, a green illuminator, a blue illuminator, a white illuminator), and the light generated by each of the different color illuminators may be directed (e.g., via a light guide, one or more mirrors, via one or more color filters) to the pixels of the electronic display. Additionally or alternatively, the pixels may regulate an amount of light that is transmitted therethrough (e.g., via one or more color filters, polarizers, etc.) such that the light emitted from the electronic display 12 corresponds to the image data. As should be appreciated, such electronic displays 12 may include reflective technology displays (e.g., digital micro-mirror displays (DMDs), ferroelectric-liquid-crystal-on-silicon (FLCOS) display, etc.), liquid crystal displays (LCDs), or any suitable electronic display having illuminators with light directing/regulating components.

Figure 7:
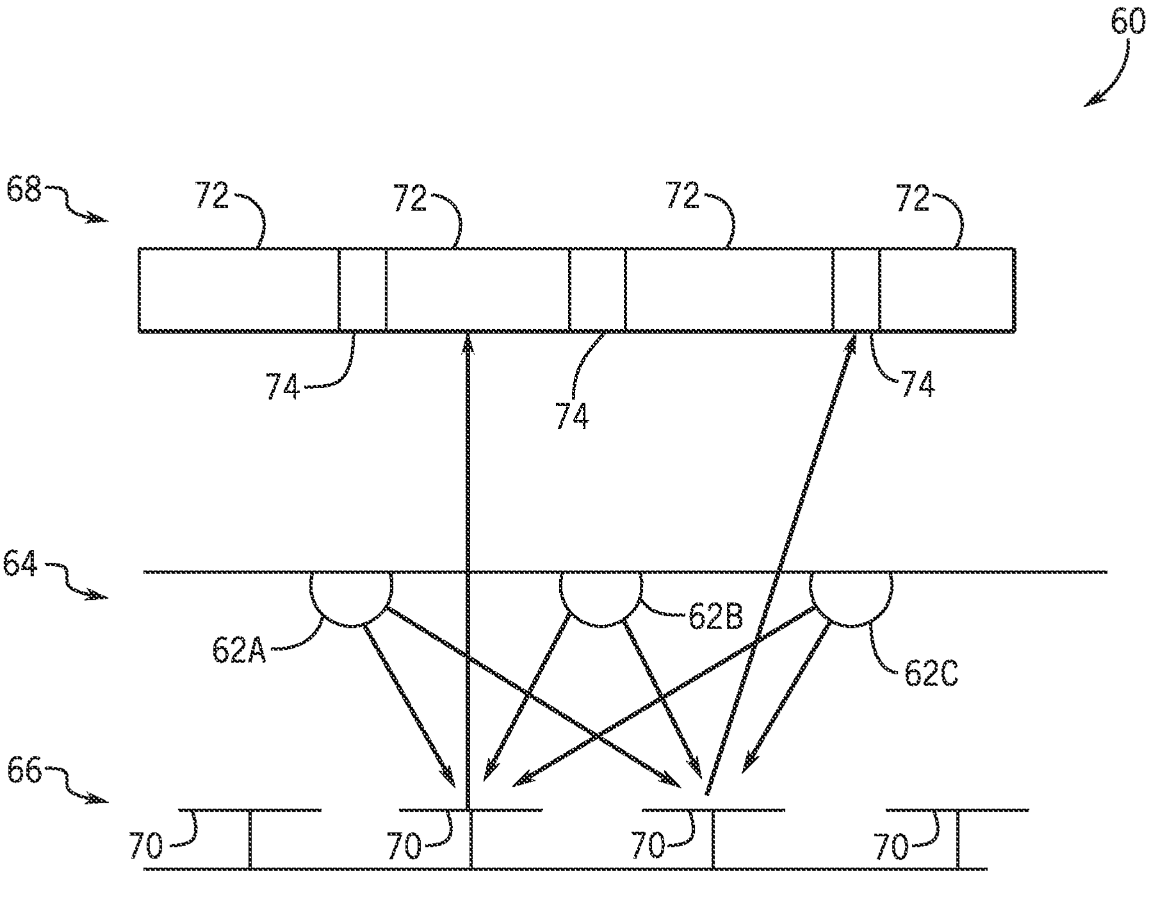
FIG. 7 is a schematic view of an example reflective technology display, in accordance with an embodiment.
Figure 8:
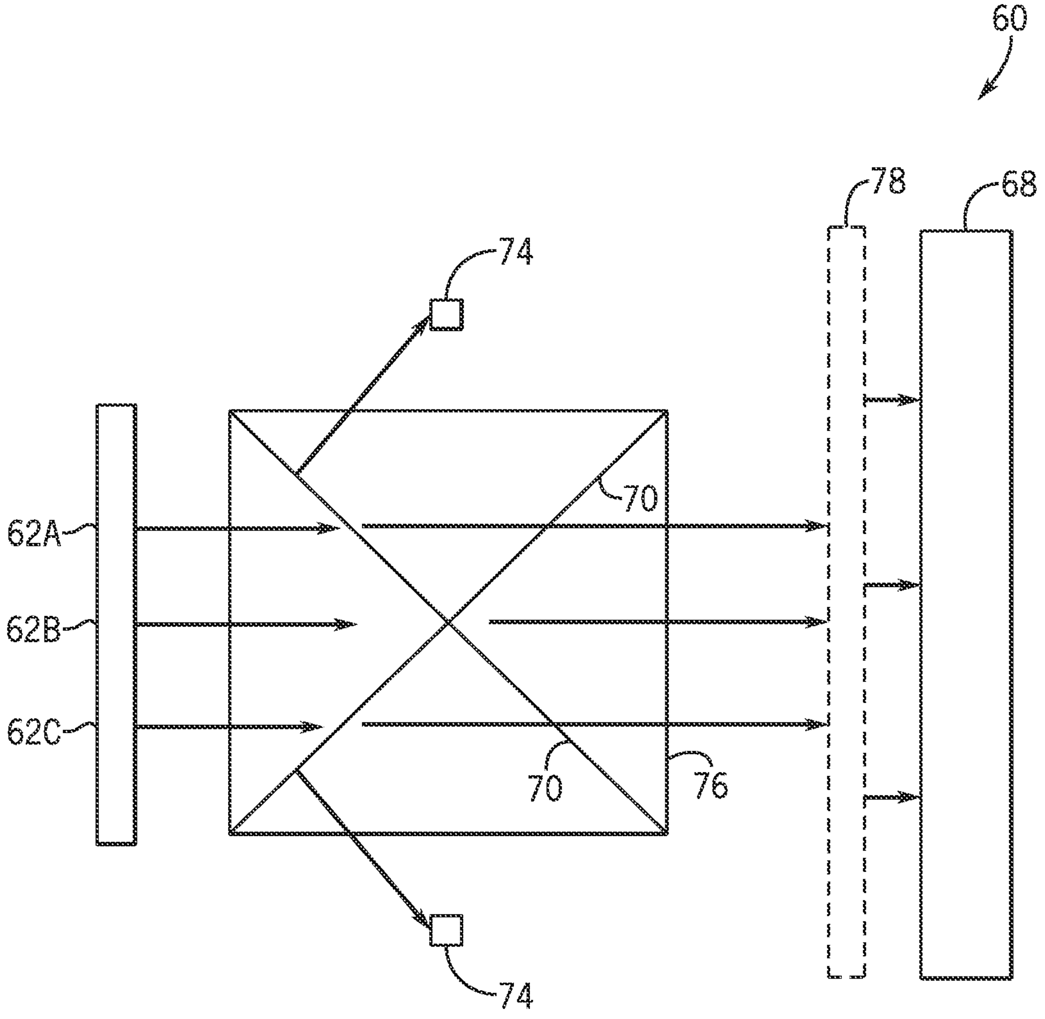
FIG. 8 is a schematic view of an example reflective technology display with a mirror array, in accordance with an embodiment.

To help illustrate, FIGS. 7 and 8 are schematic views of example reflective technology displays 60 having different color component illuminators 62. In some embodiments, a reflective technology display 60 may include an illuminator layer 64, a reflective layer 66, and a pixel layer 68, as in FIG. 7. For example, the illuminator layer 64 may include different color component illuminators 62 (e.g., a red illuminator 62A, a green illuminator 62B, and a blue illuminator 62C, collectively 62) that generate light in their respective color. The reflective layer 66 may include one or more mirrors 70 that reflect the light generated by the illuminators 62 to one or more pixel locations 72 of the pixel layer 68. At each pixel location 72, the light generated by the illuminators 62 may be visible on the electronic display 12 according to the display image data 56. For example, the mirrors 70 may reflect a portion of the generated light to a pixel location 72 for a certain duty cycle to provide a particular luminance level for an image frame. Additionally or alternatively, the pixel locations 72 may include active pixels that limit the amount of light passing therethrough (e.g., based on the display image data 56).

Furthermore, in some embodiments, the mirrors 70 may direct light from the illuminators 62 to either the pixel locations 72 or to one or more light attenuators 74. A light attenuator 74 may include a heat sink and/or a light absorbing surface such as a black mask. If a pixel location 72 is not to receive light (e.g., based on the display image data 56), a mirror 70 may direct the light from the illuminator 62 to a light attenuator 74 instead of the pixel location 72, effectively turning "off" the pixel at the pixel location 72 for that time. For example, an image frame may be divided into multiple sub-frames such that the mirrors 70 alternate between directing the generated light to the pixel location 72 and the light attenuator 74 such that, in the aggregate, the amount of time (e.g., duty cycle) that the pixel location 72 is emitting the generated light is proportional to the desired luminance output at the pixel location 72 (e.g., according to the display image data 56). Indeed, the same mirrors 70 may be used in a time-multiplexed way for different color channels. For example, the red illuminator 62A may be on for a first period, the green illuminator 62B may be on for a second period, and the blue illuminator 62C may be on for a third period. Each mirror 70 may correspond to a pixel location 72 that may display red light during the first period, green light during the second period, and blue light during the third period.

In some embodiments, the mirrors 70 may be disposed in a mirror array 76, as in FIG. 8. For example, the illuminators 62 may project light to a mirror array 76 having separate mirrors for different pixel locations 72. Moreover, in some embodiments, a light guide 78 may further direct the reflected light from the mirror array 76 to the pixel locations 72 of the pixel layer 68 for viewing. Additionally, the mirror array 76 may direct the generated light to a light attenuator 74 or to the viewed portion of the pixel layer 68 via or sans light guide 78. Although shown as a unidirectional light guide 78, as should be appreciated, the light guide 78 may direct the light from the mirror array 76 in any suitable direction to be viewed at the corresponding pixel locations 72 on the electronic display 12.

The mirror array 76 may be modulated such that the light emitted by the illuminators 62 appears as an image corresponding to the display image data 56. For example, independent mirrors 70 of the mirror array 76 may switch between an on-state (e.g., directed toward the pixel locations 72) and an off-state (e.g., directed towards a light attenuator 74) based on the display image data 56. In the on state, the mirrors 70 of the mirror array 76 may direct the light from the illuminators 62 to respective pixel locations 72. In the off state, the mirrors 70 of the mirror array 76 may direct the light elsewhere, such as the light attenuator 74, making the associated pixel location 72 appear dark. The mirrors 70 may be toggled between the on-state and the off-state quickly to create small bursts of light. The eyes of the viewer may integrate the light to form an image corresponding to the display image data 56.

As should be appreciated, while discussed above as relating to reflective technology displays 60 and displays having multiple color component illuminators 62, the techniques discussed herein are also applicable to electronic displays 12 having mono-colored illuminators 62 and/or transmissive displays such as LCD displays. Indeed, in some embodiments, the illuminator layer 64 may shine directly or indirectly at the pixel layer 68, and individual pixels or sub-pixels (e.g., having different color component color filters) at the pixel locations 72 may regulate the amount and/or color of light transmitted therethrough and emitted from the electronic display 12. Furthermore, the pixels may regulate (e.g., pulse-width modulate) the amount of time (e.g., duty cycle) that the pixel is actively allowing light to be transmitted through and emitted from the pixels according to a luminance value of the image data.

Figure 9:
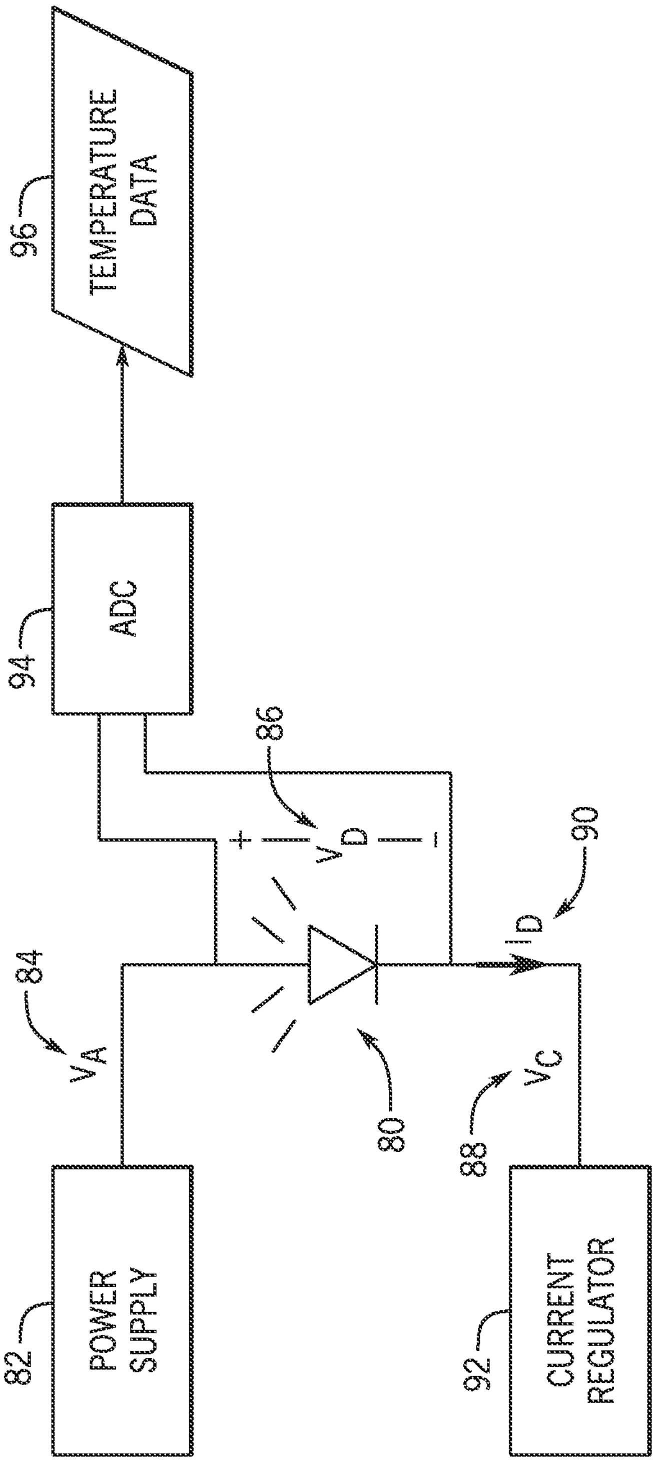
FIG. 9 is a schematic view of an embodiment of an LED driving circuit, in accordance with an embodiment

In general, an illuminator 62, such as an LED 80, may be powered via a power supply 82 to regulate the duty cycle and/or brightness level of the illuminator 62, as in FIG. 9. LEDs 80 are popular illuminators 62 in electronic displays 12, and a display panel 40 may include one or more color component LEDs 80 such as red, green, blue, and/or white LEDs 80 and/or a mono-colored backlight LED. For example, white LEDs 80 may be used with color filters in an LCD to generate different color outputs. The power supply 82 regulates an anode voltage 84, $V_A$, to the LED 80 such that a voltage differential 86, $V_D$, also known as the forward voltage, between the anode voltage 84 and a cathode voltage 88 induces a current flow 90, $I_D$, also known as a forward current, that powers the LED 80. In general, the luminance of an LED 80 is proportional to the current flow 90 through the LED. In some embodiments, one or the other of the anode voltage 84 and the cathode voltage 88 may be held constant or modulated to adjust the brightness and/or duty cycle of the LED 80. Additionally or alternatively, a current regulator 92 may regulate the current flow 90 to adjust the brightness and/or duty cycle of the illuminator 62. As should be appreciated, the LED 80 may be operated based on adjusting the current flow 90, the anode voltage 84, and/or the cathode voltage 88. For example, the power supply 82 and/or the current regulator 92 may be a part of or coupled to an LED driver that applies regulates the luminance output of the LED 80. Furthermore, the forward voltages and/or forward currents for driving different LEDs 80 may vary based on type, model, and/or color. For example, the forward voltage of a green or blue LED is generally larger than that of a red LED (e.g., for a same brightness, the green or blue LED may use a larger forward voltage). Moreover, different LEDs 80 may have different forward voltages (e.g., voltage differential 86) due to different colors, use time, environmental temperature, etc.

In some embodiments, the temperature compensation block 52 may include or be coupled to temperature sensing or measurement components proximate an illuminator 62 (e.g., LED 80) to ascertain the temperature of the illuminator 62. However, the additional components of and/or real estate utilized by separate, independent temperature sensors may increase manufacturing costs and/or be unviable for some implementations (e.g., based on space limitations). As such, in some embodiments, the temperature of an LED 80 may be derived directly from the voltage and/or current characteristics of the LED 80. Indeed, in response to being supplied with a reference current (e.g., a reference current flow 90) or a reference voltage (e.g., reference voltage differential 86), an LED 80 may exhibit a voltage response (e.g., voltage differential 86 across the LED 80) or a current response (e.g., current flow 90 through the LED 80), respectively, that is indicative of the temperature of the LED 80. For example, for a supplied reference current flow 90, the forward voltage measurement (e.g., voltage differential 86) across electrodes of the LED 80 may decrease as the temperature of the illuminator increases. In some embodiments, to estimate the temperature of the LED 80, an analog to digital converter 94 (ADC) may measure the voltage differential 86 in response to the supplied reference current flow 90, and generate temperature data 96 (e.g., a digital signal indicative of the temperature of the LED 80) based thereon. As should be appreciated, while discussed herein in the context of temperature measurement, the digital signal may be indicative of the LED's response to a reference electrical stimulus and may be used for any suitable purpose. As a non-limiting example, the voltage differential 86 or other response characteristic (e.g., current response) may be utilized in analog or digital form for estimating an age (e.g., wear) of the LED 80.

While LEDs 80 are discussed herein as example illuminators 62, as should be appreciated, the techniques of the present disclosure may be applicable to any suitable illuminator 62 capable of direct temperature measurement/estimation via application of a reference voltage or reference current. Moreover, as should be appreciated, the specific voltage and current characteristics may vary based on the type and/or model of illuminator 62, and different color component illuminators 62 may have different current/voltage responses for the same temperature.

Figure 10:
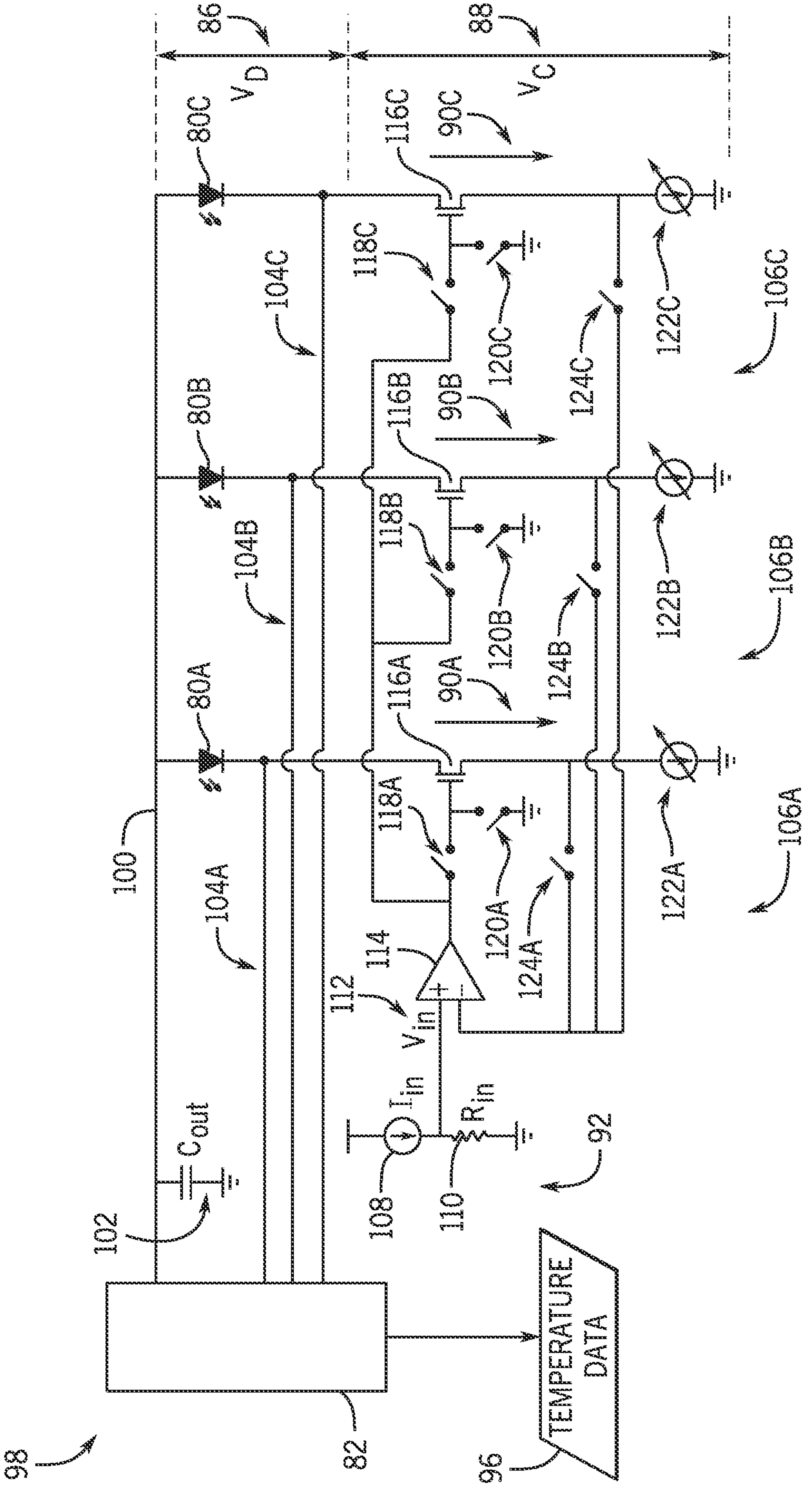
FIG. 10 is a schematic view of an embodiment of an LED driving circuit, in accordance with an embodiment.

Additionally, while FIG. 9 is representative of a single LED 80, as should be appreciated, the power supply 82, current regulator 92, ADC 94, and/or other driving and measurement components may be shared by multiple LEDs 80, as in FIG. 10. FIG. 10 is a schematic view of an LED driving circuit 98 that may drive the LEDs 80. The LED driving circuit 98 includes a power supply 82, which may be a Buck-Boost converter, to provide power (e.g., anode voltage 84) for a red LED 80A, a green LED 80B, and a blue LED 80C (cumulatively LEDs 80) that are connected to a common anode 100. The LED driving circuit 98 may also include a capacitor 102, $C_{out}$, respective voltage control circuits 104A, 104B, and 104C (cumulatively 104) for the red LED 80A, green LED 80B, and blue LED 80C, and a current regulator 92 having respective current regulation circuits 106A, 106B, and 106C for the red LED 80A, green LED 80B, and blue LED 80C for the red LED 80A, green LED 80B, and blue LED 80C. Each voltage control circuit 104 has a respective feedback loop coupled to the corresponding LED 80. The respective feedback loops are used to track the respective forward voltages (e.g., voltage differentials 86) of the corresponding LEDs 80 by using the corresponding feedback loop to feed back the cathode voltages 88 of the corresponding LEDs 80 to the power supply 82. For example, the cathode voltage 88 at the cathode end of the red LED 80A may be fed back to the power supply 82 and used to track the voltage differential 86 of the red LED 80A.

A current source 108, $I_{in}$, is used with a resistor 110, $R_{in}$, to provide an input voltage 112, $V_{in}$, to an operational amplifier 114 of the current regulator 92. In some embodiment, the input voltage 112 may be a predefined value or variable depending on implementation. Respective emission transistors 116A, 116B, and 116C (cumulatively 116) are used in the corresponding current regulation circuits 106 with corresponding power switches 118A, 118B, and 118C (cumulatively 118) and ground switches 120A, 120B, and 120C (cumulatively 120) to control the emission status of the corresponding LEDs 80. For example, in the current regulation circuit 106A of the red LED 80A, the emission transistor 116A is turned on when the power switch 118A is closed and the ground switch 120A is open. The ground switches 120 are used to discharge the gate voltages (or base voltage) at the emission transistor 116. When the ground switch 120 is closed, the gate voltage of the associated emission transistor 116 is discharged and the emission transistor 116 is turned off. When an emission transistor 116 is turned on, for example via closing the power switch 118, the associated LED 80 is connected to a respective dynamically adjustable resistor 122A, 122B, or 122C (cumulatively 122) to generate an adjustable respective current flow 90A, 90B, or 90C of the current regulation circuit 106 for the LED 80. Furthermore, respective feedback switches 124A, 124B, and 124C (cumulatively 124) may be used to provide a feedback voltage from the emitter end of the emission transistor 116 to the operational amplifier 114.

As discussed above, in the example circuitry of FIG. 10, the cathode voltage 88 of each LED 80 may be fed back to the power supply 82 as part of a feedback loop. Moreover, by utilizing the anode voltage 84 and the cathode voltage 88 together, the voltage differential 86 may be ascertained and the temperature data 96 generated based thereon. For example, the power supply 82 may include an ADC 94 to convert the measured voltage differential 86 into a digital signal indicative of the temperature of the LED 80 when a reference current flow 90 is supplied. Indeed, as discussed above, the temperature of the LED 80 may be determined by supplying a reference voltage or reference current and measuring the current response or the voltage response, respectively.

However, application of a reference voltage or a reference current (e.g., a reference electrical stimulus) to the LED 80 (e.g., to estimate the temperature directly at and via the illuminator's response) may lead to illumination of the LED 80, which may lead to image artifacts being displayed if perceived by a viewer. As discussed further below, light regulators (e.g., mirrors 70 or transmissivity regulating pixels) that adjust when and/or how much light is emitted from the electronic display 12 may be used to block or redirect the generated light (e.g., via the light attenuators 74) while the reference current or reference voltage is applied. In other words, during moments when light would otherwise not be emitted from the electronic display 12, such as between LED emissions of a single image frame, after light emissions of the image frame, and/or during any moments that the LEDs 80 would otherwise be off, the light regulators may be used to block or redirect light generated as a result of the reference current or reference voltage to maintain the appearance of off LEDs 80. As such, the temperature of an illuminator 62 may be directly measured without or with reduced image artifacts associated with the application of the reference current or a reference voltage.

Figure 11:
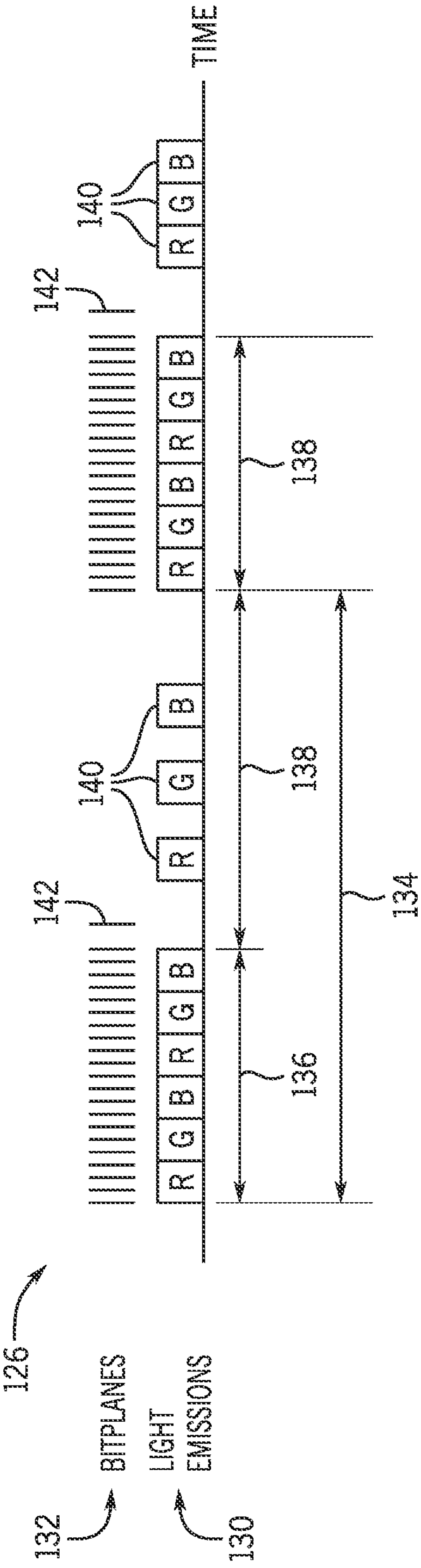
FIG. 11 is an example timing diagram for implementing reference voltages or currents between light emissions from the electronic display, in accordance with an embodiment.
Figure 12:
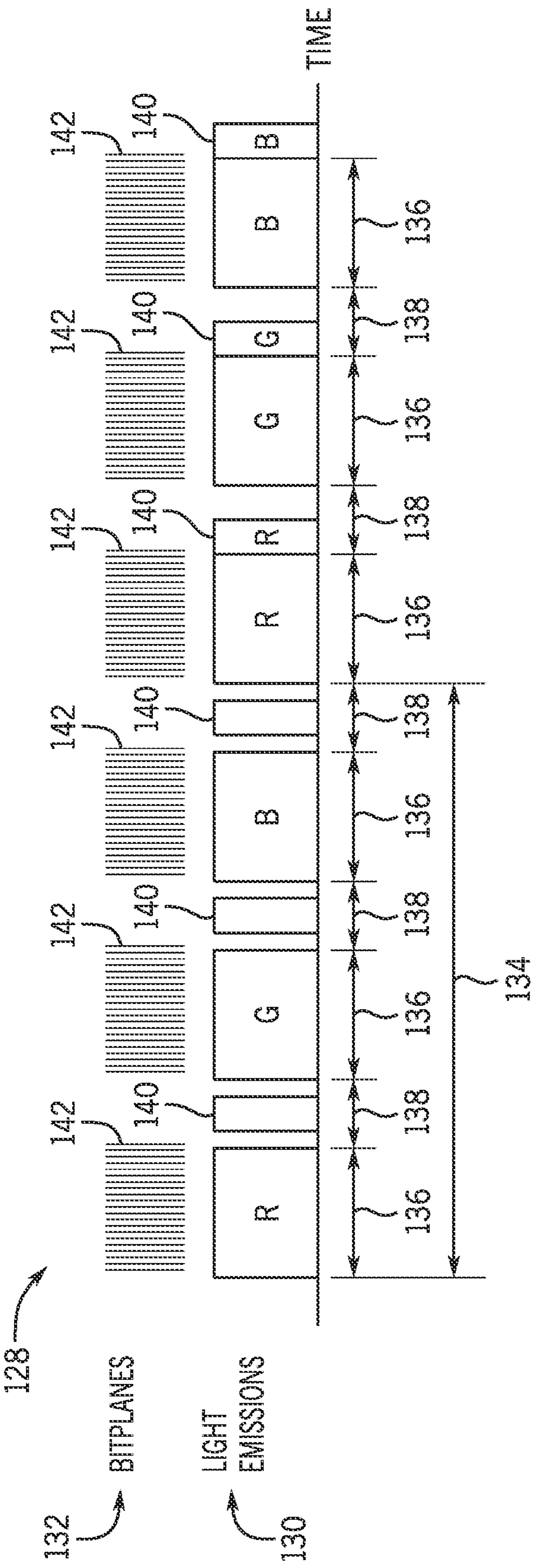
FIG. 12 is an example timing diagram for implementing reference voltages or currents between light emissions from the electronic display, in accordance with an embodiment.

FIGS. 11 and 12 are example timing diagrams 126, 128 for implementing reference voltages or currents between light emissions 130 from the electronic display 12. As discussed herein, the electronic display 12 may display an image frame by modulating the amount of time each color LED 80 has light emitted from a pixel location 72. In some embodiments, a set of bitplanes 132 may be utilized to set the arrangement of mirrors 70 and/or pixel transmissivities that control the light emitted from the pixel locations 72. Each bitplane 132 may be indicative of a set of mirror activations and/or pixel activations. For example, a bitplane 132 may set a portion of the mirrors 70 to reflect light generated by an LED 80 to a respective portion of pixel locations 72, and set other mirrors 70, associated with other pixel locations 72, to reflect the light to the light attenuator(s) 74. As such, the bitplane 132 may designate certain pixel locations 72 as "on" and other pixel locations as "off". During an image frame, multiple bitplanes 132 for each color component may be implemented such that, in the aggregate, the relative on/off time for each pixel location 72 is indicative of the display image data 56 for each color component and thus the image. As should be appreciated, the human eye may temporally average the light emissions to perceive the image over the image frame.

In some scenarios, the frame length 134 of the image frame may be longer than the emission period 136 of the light emissions 130 of the LEDs 80, leaving off periods 138 between light emissions 130 associated with displaying the image. As used herein, the frame length 134 of the image frame is the time between starts of emission periods 136 associated with separate image frames and includes the off periods 138 after and/or between emission periods 136 of the same image frame. The off periods 138 are indicative of moments where no light is desired to be emitted from the pixel locations 72. During the off periods 138, reference voltages and/or reference currents may be applied and temperature data 96 generated based on the response of the LEDs 80. The reference voltages and/or currents may cause reference emissions 140, and an off bitplane 142 may set mirrors 70 and/or pixel transmissivities to the off positions such that reduced or no light is emitted from the pixel locations 72. As such, the temperature of the LEDs 80 may be directly measured during the image frame by utilizing off periods 138 between emission periods 136 associated with the display image data 56. As shown in the timing diagram 126 of FIG. 11, the reference emissions 140, associated with temperature measurements may be separated or grouped. Moreover, the temperature of each color LED 80 may be measured in the same off period 138 or in individual off periods 138.

Furthermore, as shown in the timing diagram 128 of FIG. 12, in some scenarios, the emission periods 136 for the different color components may be separated by off periods 138. As such, in some embodiments, temperature measurements, and associated reference emissions 140, may occur between emission periods 136 of the same image frame. Moreover, as should be appreciated, the temperature measurements, and associated reference emissions 140, may occur at any suitable moment during the off periods 138. For example, the off bitplane 142 may occur immediately after an emission period 136 such that the LED 80 being measured for temperature may be set at or maintained at the reference voltage/current immediately after the emission period 136 of that LED 80 or any LED 80 may be set to the reference voltage/current for measurement at any suitable time after the off bitplane 142 is implemented. Furthermore, as should be appreciated, the temperature measurements may be made during each off period 138, periodically after a number of image frames, periodically in time, and/or when requested (e.g., by the temperature compensation block 52). Additionally, while discussed above as measuring the temperatures of the LEDs 80 individually, if implemented with separate LED driving circuits 98 and/or response measurement components (e.g., ADCs 94), the temperature of multiple LEDs 80 may be measured simultaneously while the off bitplane 142 is engaged.

Figure 13:
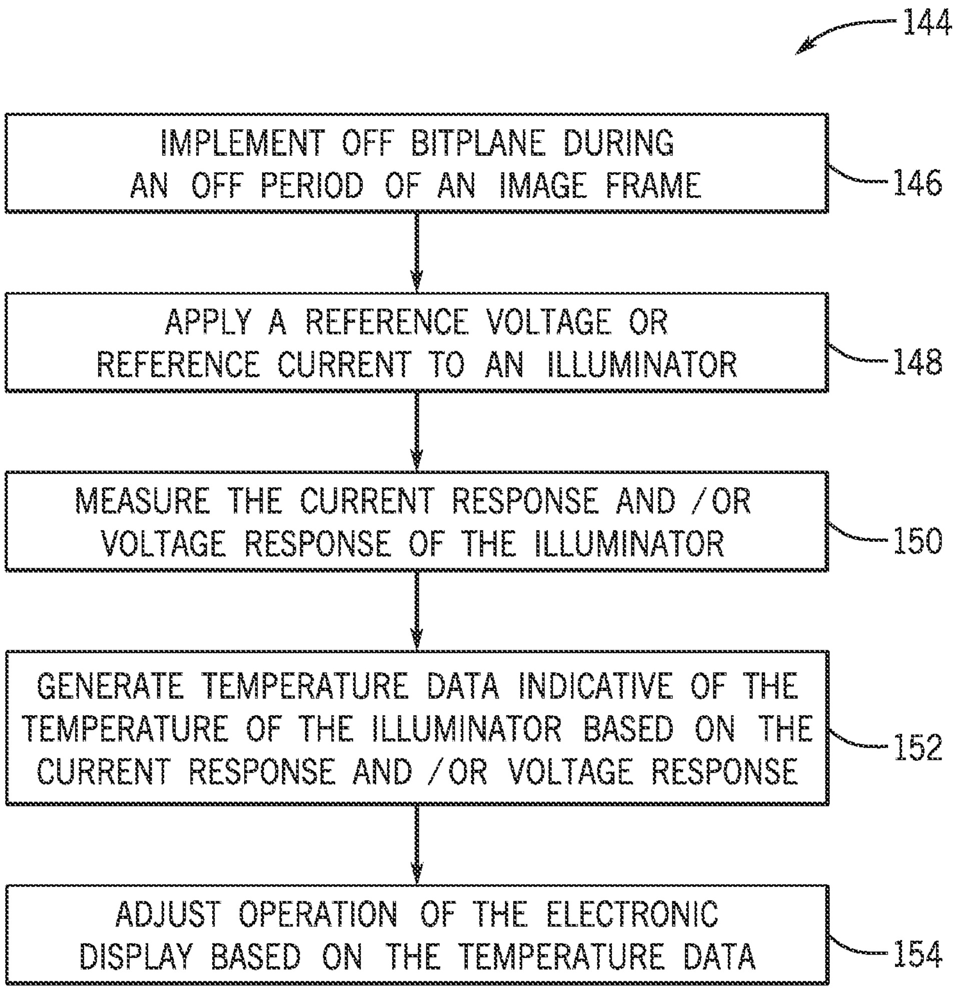
FIG. 13 is a flowchart of an example process for directly measuring the temperature of an illuminator, in accordance with an embodiment.

FIG. 13 is a flowchart 144 of an example process for directly measuring the temperature of an illuminator 62. During an off period 138 of an image frame (e.g., otherwise having no light emissions 130), an off bitplane 142 may be implemented (process block 146). For example, the off bitplane 142 may adjust mirrors 70 (e.g., of a mirror array 76) to direct light to light attenuators 74 instead of pixel locations 72. Additionally or alternatively, the off bitplane 142 may adjust pixel transmissivities to block all or a portion of the light generated by the illuminators 62. A reference voltage or reference current may be applied to the illuminator 62 (process block 148), and the current response and/or voltage response of the illuminator 62 may be measured (process block 150). Temperature data 96 indicative of the temperature of the illuminator 62 may be generated based on the current response and/or voltage response (process block 152). Additionally, operation of the electronic display 12 may be adjusted (e.g., via the temperature compensation block 52) based on the temperature data 96 (process block 154).

The specific embodiments described above have been shown by way of example, and it should be understood that these embodiments may be susceptible to various modifications and alternative forms. It should be noted that, although LEDs 80 and LED drivers are used in the embodiments described above, other illuminators and their drivers may use the techniques presented above. Moreover, although the above referenced flowchart 144 is shown in a given order, in certain embodiments, process/decision blocks may be reordered, altered, deleted, and/or occur simultaneously. Additionally, the referenced flowchart 144 is given as an illustrative tool and further decision and process blocks may also be added depending on implementation. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device comprising an electronic display configured to display an image frame based on image data, wherein the electronic display comprises:

an illuminator configured to generate a light;

a plurality of light regulators configured to control emission of the light at a plurality of pixel locations of the electronic display based on bitplane data;

driving circuitry configured to apply an operating electrical stimulus to the illuminator during an emission period of the image frame and a reference electrical stimulus during an off period of the image frame, wherein the bitplane data comprises an off bitplane while the reference electrical stimulus is applied; and measurement circuitry configured to measure a response characteristic of the illuminator in response to the reference electrical stimulus.

2. The device of claim 1, comprising control circuitry configured to adjust a parameter of operation of the electronic display based on the response characteristic.

3. The device of claim 2, wherein the measurement circuitry is configured to generate temperature data indicative of a temperature of the illuminator based on the response characteristic, and wherein the control circuitry is configured to adjust the parameter of operation based on the temperature data.

4. The device of claim 2, wherein the parameter of operation comprises the operating electrical stimulus, and wherein the operating electrical stimulus comprises an operating voltage or an operating current.

5. The device of claim 2, wherein the parameter of operation comprises the image data.

6. The device of claim 1, wherein the reference electrical stimulus comprises a reference current, and wherein the response characteristic comprises a voltage response.

7. The device of claim 1, wherein the illuminator comprises a light emitting diode (LED).

8. The device of claim 1, wherein, in response to the off bitplane, the plurality of light regulators are configured to direct the light to one or more light attenuators instead of the plurality of pixel locations.

9. The device of claim 1, wherein the electronic display comprises a reflective technology display.

10. The device of claim 9, wherein the plurality of light regulators comprises a plurality of mirrors, each associated with a respective pixel location of the plurality of pixel locations.

11. A method comprising:

supplying a first electrical stimulus to an illuminator of an electronic display during an image frame;

operating a plurality of light regulators according to one or more bitplanes while supplying the first electrical stimulus to the illuminator, wherein the one or more bitplanes are associated with image data of the image frame;

supplying a second electrical stimulus to the illuminator during the image frame;

operating the plurality of light regulators according to an off bitplane while supplying the second electrical stimulus to the illuminator;

measuring an electrical response of the illuminator while supplying the second electrical stimulus to the illuminator; and generating temperature data indicative of a temperature of the illuminator based on the electrical response.

12. The method of claim 11, wherein operating the plurality of light regulators according to the off bitplane comprises directing light generated by the illuminator in response to the second electrical stimulus to one or more light attenuators.

13. The method of claim 11, comprising supplying a third electrical stimulus to the illuminator during a second image frame subsequent to the image frame, wherein the third electrical stimulus is based on the temperature data.

14. The method of claim 11, wherein the electrical response of the illuminator comprises a forward voltage response to a reference current of the second electrical stimulus.

15. The method of claim 11, wherein the illuminator comprises a light emitting diode (LED) and the plurality of light regulators comprises a respective plurality of mirrors or a respective plurality of transmissivity regulating pixels.

16. An electronic display comprising:

a first light emitting diode (LED) configured to emit a first light at a first color;

a second LED configured to emit a second light a second color different from the first color;

LED driving circuitry configured to apply:

a first operating electrical stimulus to the first LED during a first emission period of an image frame, wherein the first emission period is indicative of light emissions of the first color according to image data;

a second operating electrical stimulus to the second LED during a second emission period of the image frame, wherein the second emission period is indicative of light emissions of the second color according to the image data; and a reference electrical stimulus to the first LED during an off period of the image frame, wherein the off period is indicative of no light emissions associated with the image data; and an analog to digital converter configured to receive a response characteristic of the first LED while the reference electrical stimulus is applied and generate temperature data indicative of a temperature of the first LED based on the response characteristic.

17. The electronic display of claim 16, comprising a plurality of mirrors configured to:

during the first emission period, direct the first light to a plurality of pixel locations according to a first set of one or more bitplanes based on the image data;

during the second emission period, direct the second light to the plurality of pixel locations according to a second set of one or more bitplanes based on the image data; and during the off period, direct the first light to one or more light attenuators and not to the plurality of pixel locations.

18. The electronic display of claim 16, wherein the off period is between the first emission period and the second emission period.

19. The electronic display of claim 16, wherein the off period is after the first emission period and the second emission period and before a third emission period of a second image frame directly subsequent the image frame.

20. The electronic display of claim 16, wherein the reference electrical stimulus comprises a reference voltage and the response characteristic comprises a current response, or the reference electrical stimulus comprises a reference current and the response characteristic comprises a voltage response.

* * * * *